United States Patent
McCash

(10) Patent No.: US 9,573,574 B2
(45) Date of Patent: Feb. 21, 2017

(54) BRAKE MODULATOR FOR PARKING BRAKE SYSTEM OF A WORK VEHICLE

(71) Applicant: CNH Industrial America, LLC, New Holland, PA (US)

(72) Inventor: Benjamin McCash, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/698,300

(22) Filed: Apr. 28, 2015

(65) Prior Publication Data
US 2016/0318496 A1    Nov. 3, 2016

(51) Int. Cl.
B60T 7/10        (2006.01)
B60T 13/16       (2006.01)
B60T 7/12        (2006.01)

(52) U.S. Cl.
CPC ............... B60T 13/168 (2013.01); B60T 7/10 (2013.01); B60T 7/122 (2013.01)

(58) Field of Classification Search
CPC ............ B60T 7/10; B60T 7/101; B60T 11/28; B60T 13/168; B60T 13/18
USPC .......................................... 303/22.8, 54, 56
See application file for complete search history.

(56) References Cited

U.S. PATENT DOCUMENTS 3,042,061 A * 7/1962 Dobrikin ............... B60T 15/041
                                                                 303/56
3,096,789 A    7/1963 Horowitz et al.
3,744,856 A * 7/1973 Doversberger ....... B60T 13/141
                                                                 303/54
3,985,063 A    10/1976 Lemon
4,519,653 A * 5/1985 Smith .................. B60R 25/007
                                                                188/265

(Continued)

FOREIGN PATENT DOCUMENTS

CN    201901123    7/2011
DE    19540747     2/1997

(Continued)

OTHER PUBLICATIONS

AeroQuip Corp/Haldex . Maxibrake Spring BrakeApr. 28, 2015. (2 Pages).

(Continued)

Primary Examiner — Thomas J Williams
(74) Attorney, Agent, or Firm — Rickard K. DeMille; Rebecca L. Henkel

(57) ABSTRACT

Brake modulators for parking brake systems of work vehicles are provided. A brake modulator includes a housing defining a fluid chamber, an auxiliary chamber, a fluid inlet channel, and a fluid outlet channel. The brake modulator further includes a piston disposed within the housing between the fluid chamber and the auxiliary chamber. The piston is movable between a first position wherein the fluid chamber has a first volume and a second position wherein the fluid chamber has a second volume greater than the first volume. The brake modulator further includes a biasing element providing a biasing force on the piston towards the first position, a rod extending between a first end disposed within the housing and a second end disposed exterior to the housing, and a handle connected to the second end of the rod. The rod is manually actuatable to move the piston between the first and second positions.

17 Claims, 7 Drawing Sheets

(56) References Cited

U.S. PATENT DOCUMENTS

| | | | |
|---|---|---|---|
| 4,881,725 A | 11/1989 | Shioda et al. | |
| 5,251,971 A | 10/1993 | Reinartz et al. | |
| 5,286,095 A * | 2/1994 | Sell | B60T 13/265 |
| | | | 303/9.76 |
| 6,872,165 B2 | 3/2005 | Gierer | |
| 8,316,891 B2 | 11/2012 | Koyama | |
| 2012/0168265 A1 | 7/2012 | Mahnkopf | |

FOREIGN PATENT DOCUMENTS

| | | |
|---|---|---|
| EP | 0018228 | 3/1983 |
| GB | 687793 | 2/1953 |

OTHER PUBLICATIONS

Rexroth—Power Brake Valve. Apr. 28, 2015 (1 Page).
European Search Report and Opinion for European Application No. 16166245 dated Sep. 13, 2016 (6 pages).

* cited by examiner

BRAKE MODULATOR FOR PARKING BRAKE SYSTEM OF A WORK VEHICLE

FIELD OF THE INVENTION

The present subject matter relates generally to work vehicles and, more particularly, to improved parking brake systems suitable for use with transmissions of work vehicle.

BACKGROUND OF THE INVENTION

Typically, work vehicles, such as tractors and other agricultural vehicles, have a mechanical transmission such as a continuously variable transmission (CVT) or a power shift transmission (PST). Conventionally, each type of transmission utilizes a parking brake in order to maintain the vehicle in a parked or stopped condition when the vehicle is placed in park or when performing a hill holding operation. In addition, the parking brake may also be used to reduce the speed of the work vehicle, such as when the work vehicle experiences a loss of functionality (e.g., loss of electrical power and/or hydraulic pressure).

In many instances, conventional parking brakes for work vehicle transmissions are configured to be engaged and disengaged via an electric actuator (e.g., a solenoid activated actuator). Unfortunately, several disadvantages are typically associated with the use of electric actuators for engaging and disengaging parking brakes. Specifically, the electric actuators typically present mounting challenges within the work vehicle, since the actuator is often mounted at a location that is significantly spaced apart from the transmission. In addition, operation of an electric actuator requires the use of complex computer logic to ensure that the associated parking brake is engaged and disengaged at the appropriate time. However, even despite the use of complex computer logic, system faults (e.g., short circuits, etc.) may often result in the electric actuator being unintentionally commanded to engage the parking brake, which can cause significant damage to the brake itself or to the transmission as a whole when the vehicle is still in motion.

More recently, hydraulic brake actuators have been utilized to engage and disengage parking brakes of work vehicle transmissions. Typically, a piston of a hydraulic actuator is moved linearly due to selective increases and decreases in hydraulic fluid within a housing of the hydraulic actuator. A rod connected to the piston is also moved linearly, and this rod is connected via a suitable mechanical linkage to the parking brake. The parking brake is selectively engaged and disengaged as a result of the movement of the piston.

In many cases, a decrease in the hydraulic fluid within a chamber of the housing causes engagement of the parking brake. This allows the parking brake to act as an automatic emergency brake if hydraulic fluid pressure is lost. A loss in such pressure will result in a decrease in the hydraulic fluid within the chamber and a corresponding engagement of the parking brake. However, this automatic emergency brake functionality has a number of disadvantages. For example, once the parking brake has been engaged in cases wherein hydraulic fluid pressure is lost, it cannot be disengaged without repair to the hydraulic fluid supply or use of, for example, an independent pump to re-pressurize the line. Further, engagement of the parking brake in such situations is immediate, resulting in immediate and rapid deceleration of the work vehicle. This can cause injury to the user of the work vehicle and damage to the work vehicle itself.

Accordingly, improved parking brake systems are desired in the art. In particular, parking brake systems which allow for selective engagement and disengagement in emergency situations, and which allow for brake modulation during braking events, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a brake modulator is provided for a parking brake system of a work vehicle. The brake modulator includes a housing extending between a first end and a second end, the housing defining a fluid chamber, an auxiliary chamber, a fluid inlet channel in fluid communication with the fluid chamber, and a fluid outlet channel in fluid communication with the fluid chamber. The brake modulator further includes a piston disposed within the housing between the fluid chamber and the auxiliary chamber. The piston is movable between a first position wherein the fluid chamber has a first volume and a second position wherein the fluid chamber has a second volume greater than the first volume. The brake modulator further includes a biasing element providing a biasing force on the piston towards the first position. The brake modulator further includes a rod extending between a first end disposed within the housing and a second end disposed exterior to the housing, and a handle connected to the second end of the rod. The rod is manually actuatable to move the piston between the first position and the second position.

In accordance with another embodiment, a parking brake system for use with a transmission of a work vehicle is provided. The parking brake system includes a braking mechanism housed within the transmission, and a brake actuator. The brake actuator is coupled to the braking mechanism to allow the braking mechanism to be actuated between an engaged state and a disengaged state. The brake actuator includes a housing extending between a first end and a second end, the housing defining a second-side chamber and a first-side chamber. The brake actuator further includes a piston positioned within the housing between the first-side chamber and the second-side chamber, the piston movable between a first position wherein the braking mechanism is actuated to the engaged state and a second position wherein the braking mechanism is actuated to the disengaged state. The parking brake system further includes a brake modulator in fluid communication with the brake actuator. The brake modulator includes a housing extending between a first end and a second end, the housing defining a fluid chamber, an auxiliary chamber, a fluid inlet channel in fluid communication with the fluid chamber, and a fluid outlet channel in fluid communication between the fluid chamber and the first-side chamber of the brake actuator. The brake modulator further includes a piston disposed within the housing between the fluid chamber and the auxiliary chamber. The piston is movable between a first position wherein the fluid chamber has a first volume and a second position wherein the fluid chamber has a second volume greater than the first volume. The brake modulator further includes a biasing element providing a biasing force on the piston towards the first position. The brake modulator further includes a rod extending between a first end disposed within the housing and a second end disposed exterior to the housing, and a handle connected to the second end of the rod. The rod is manually actuatable to move the piston between the first position and the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
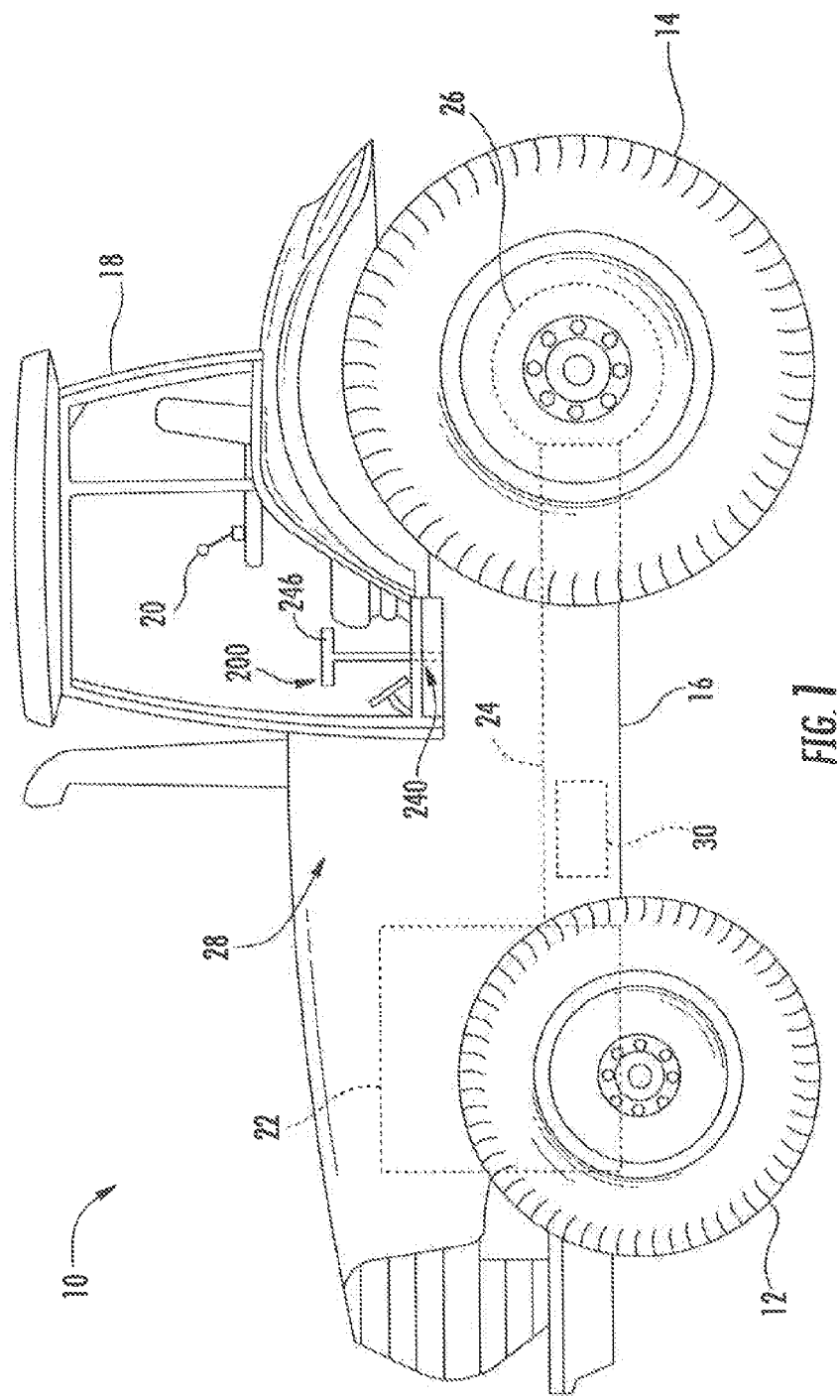
FIG. 1 illustrates a side view of a work vehicle in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a side view of one embodiment of a work vehicle 10. As shown, the work vehicle 10 is configured as an agricultural tractor, which may for example be any suitable large or small frame tractor. However, in other embodiments, the work vehicle 10 may be configured as any other suitable work vehicle known in the art, such as various other agricultural vehicles, earthmoving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. In alternative embodiments, work vehicle 10 may include tracks instead of wheels. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10. Moreover, the work vehicle 10 may also include a parking brake 30 associated with the transmission 24. As will be described below, the parking brake 30 may generally have any suitable configuration that allows it to function as described herein.

Figure 2:
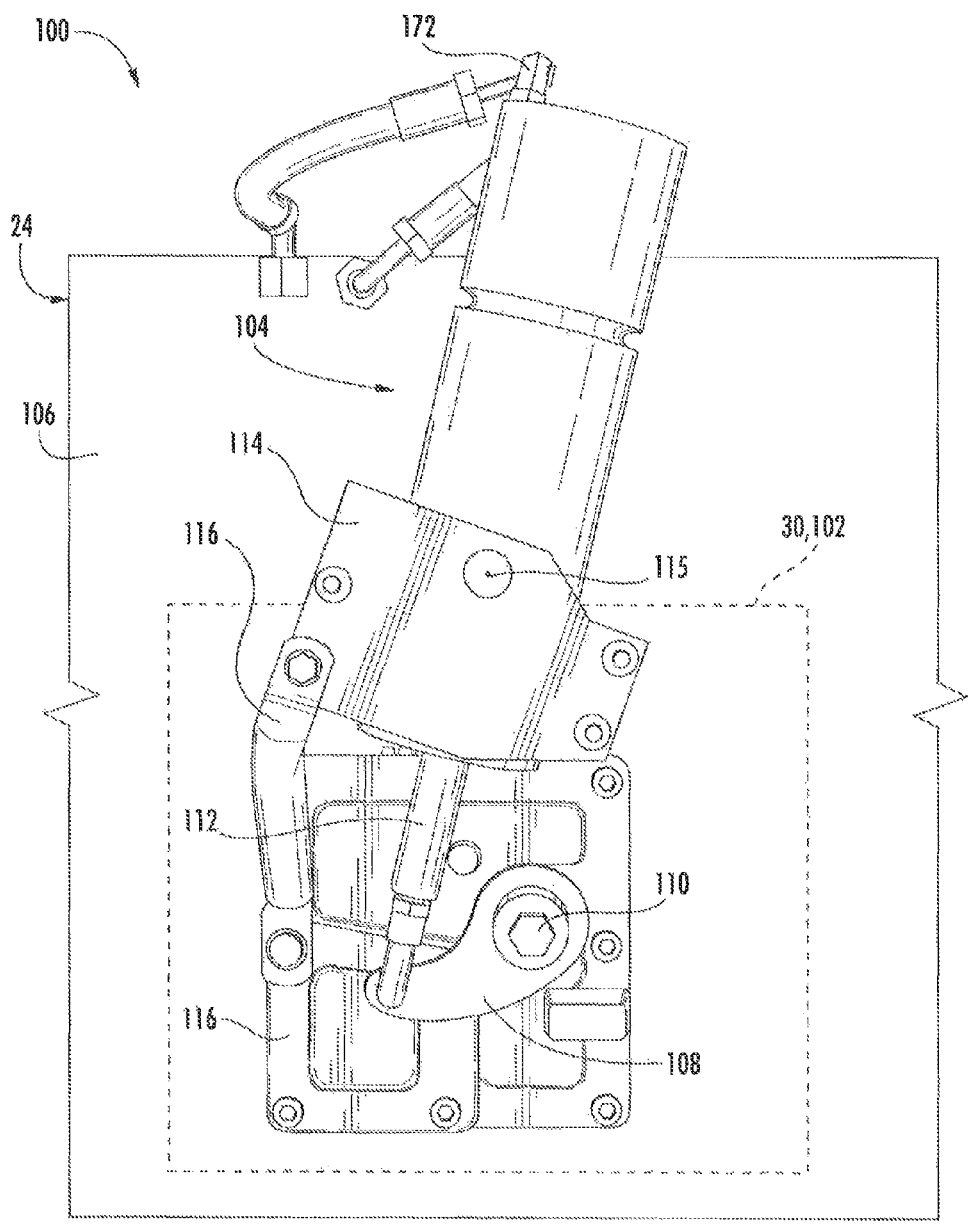
FIG. 2 illustrates a side view of a parking brake system suitable for use with a transmission of the work vehicle shown in FIG. 1, particularly illustrating a brake actuator of the system mounted to the exterior of the transmission, in accordance with one embodiment of the present disclosure.

Referring now to FIG. 2, a side view of one embodiment of a parking brake system 100 suitable for use with a transmission 24 of a work vehicle 10 is illustrated in accordance with aspects of the present subject matter. To simplify the illustration, only a partial, schematic view of the transmission 24 (indicated simply by the rectangular box) has been shown in FIG. 2. One of ordinary skill in the art should readily appreciate that the disclosed system 100 may generally be configured for use with any suitable transmission 24 that utilizes a parking brake 30, including power shift transmissions and continuously variable transmissions.

As shown in FIG. 2, the system 100 may include a braking mechanism 102 and a brake actuator 104 coupled to the braking mechanism 102. In general, the braking mechanism 102 may be configured to serve as the parking brake 30 for the work vehicle 10. Thus, in several embodiments, the braking mechanism 102 may be housed within the interior of the transmission 24 (as indicated by the dashed box) and may be configured to prevent rotational output of the transmission 24 when the braking mechanism 102 is engaged, such as when the work vehicle 10 is placed in park.

It should be appreciated that the braking mechanism 102 may generally have any suitable configuration that allows it to function as the vehicle's parking brake 30. For example, in several embodiments, the braking mechanism 102 may correspond to a brake clutch configured in operative association with an output shaft (not shown) of the transmission 24. In such embodiments, the braking mechanism 102 may include one or more clutch plates that, when actuated, engage corresponding clutch components coupled to the output shaft so as to prevent rotation of the output shaft. However, in other embodiments, braking mechanism 102 may have any other suitable parking brake configuration known in the art.

In some embodiments as shown in FIG. 2, the brake actuator 104 of the disclosed system 100 may be configured to be positioned outside the transmission 24, such as by coupling the brake actuator 104 to the exterior of the transmission housing 106. Alternatively, however, brake actuator 104 may be positioned inside the transmission 24. In general, the brake actuator 104 may be configured to actuate the braking mechanism 102 between an engaged state (e.g., when the vehicle 10 is desired to be in park) and a disengaged state (e.g., when the vehicle 10 is desired to be driven). For example, in some embodiments as shown, the brake actuator 104 may be configured to be coupled to a lever arm 108 positioned outside of the transmission 24, which may, in turn, be rotatably coupled to the braking mechanism 104 via a shaft 110 extending through the transmission housing 106 from the exterior to the interior of the transmission 24. As such, by linearly actuating a piston rod 112 associated with the brake actuator 104 (e.g., by extending or retracting the piston rod 112), the lever arm 108 and corresponding shaft 110 may be rotated clockwise or counterclockwise, thereby allowing for the braking mechanism 102 to be moved to either its engaged state or its disengaged state.

In embodiments wherein the brake actuator 104 is exterior to the transmission, it should be appreciated that the brake actuator 104 may be configured to be coupled to the exterior of the transmission using any suitable attachment means and/or mechanism known in the art. For instance, as shown in FIG. 2, the brake actuator 104 may be supported along the exterior of the transmission 24 via a mounting bracket 114 configured to be coupled to the transmission housing 106. In several embodiments, the mounting bracket 114 may be box-shaped or may otherwise define a hollow tube or opening through which the actuator 104 may at least partially extend. In such embodiments, as will be described below, the brake actuator 104 may be configured to be pivotally coupled to the mounting bracket 114 so as to allow the actuator 104 to pivot relative to the bracket 114 about a fixed pivot point 115. Moreover, as shown in FIG. 2, one or more secondary support brackets or tubes 116 may be coupled between the mounting bracket 114 and the exterior of the transmission 24 to provide additional support for the brake actuator 104.

Figure 3:
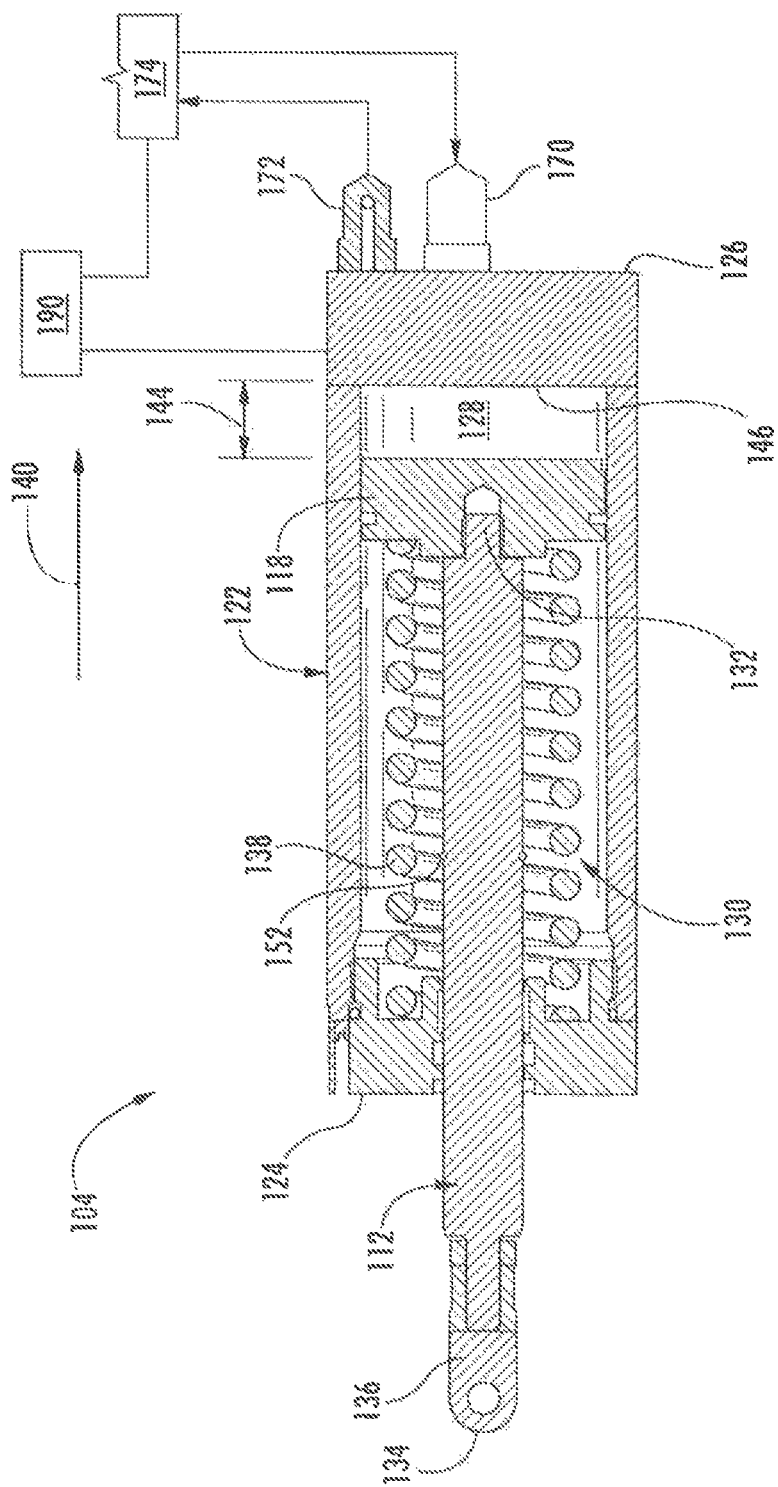
FIG. 3 illustrates a cross-sectional view of the brake actuator shown in FIG. 2, particularly illustrating a piston of the actuator moved to a first position in order to engage an associated braking mechanism of the disclosed system, in accordance with one embodiment of the present disclosure.
Figure 4:
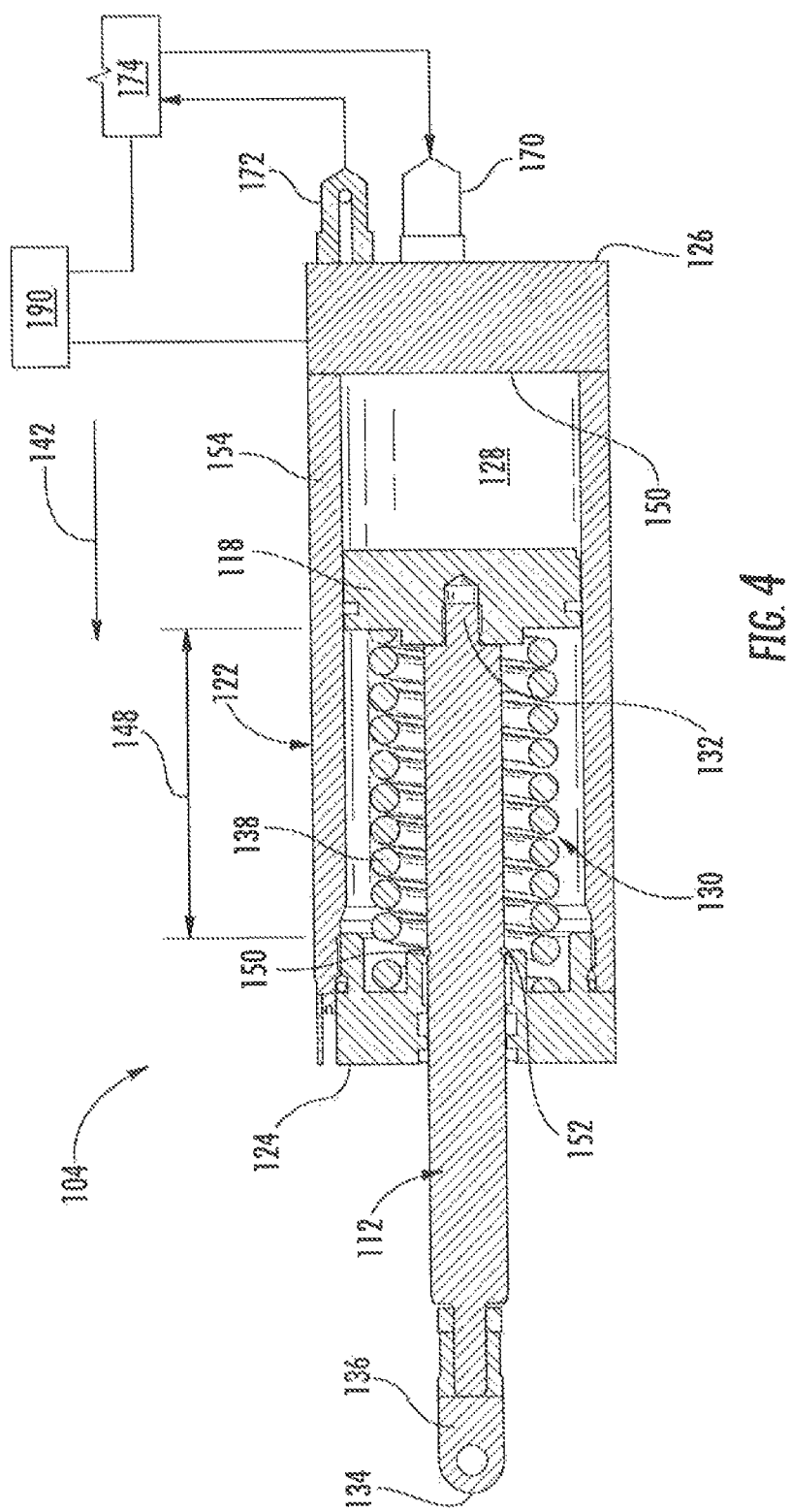
FIG. 4 illustrates another cross-sectional view of the brake actuator shown in FIG. 2, particularly illustrating the piston moved to a second position in order to disengage the braking mechanism, in accordance with one embodiment of the present disclosure.

Referring now to FIGS. 3 and 4, embodiments of a brake actuator 104 suitable for use within the disclosed parking brake system 100 are illustrated in accordance with aspects of the present subject matter. Specifically, FIGS. 3 and 4 illustrate cross-sectional views of the brake actuator 104, with FIG. 3 illustrating a primary piston 118 of the brake actuator 104 moved to a first, engaged position and FIG. 4 illustrating the primary piston 118 moved to a second, disengaged position.

In several embodiments, the brake actuator 104 may be configured as a spring-applied, hydraulic-release cylinder. Thus, as shown in FIGS. 3 and 4, the brake actuator 104 may generally include a cylindrical outer shell or housing 122 extending lengthwise between a first end 124 and a second end 126. The housing 122 may define two primary internal chambers, namely a first-side chamber 128 and a second-side chamber 130. In addition, the brake actuator 104 may include a piston 118 disposed within the housing 122 between the first-side and second-side chambers 128, 130 and may further optionally include a piston rod 112 coupled to and extending outwardly from the piston 118. For instance, the piston rod 112 may extend from a first interior end 132 coupled to the piston 118 through the second-side chamber 130 to a second exterior end 134 positioned exterior to the housing 122. In such an embodiment, the exterior end 134 of the piston rod 112 may include or be coupled to a suitable attachment mechanism 136 (e.g. a clevis fastener) configured to allow the piston rod 112 to be coupled to the lever arm 108 of the disclosed system 100. Moreover, the brake actuator 104 may also include a spring 138 positioned within the second-side chamber 130 so as to be engaged between the piston 118 and the first end 124 of the housing 122.

During normal operation of the brake actuator 104 (e.g., when the actuator 104 is being operated in a normal or first operating mode), the piston 118 may generally be configured to be moved between a first position (FIG. 3) and a second position (FIG. 4). Specifically, in the absence of pressurized fluid within the first-side chamber 128, the spring 138 may generally be configured to apply a biasing force against the piston 118 (e.g., in the direction of arrow 140 shown in FIG. 3) that tends to push the piston 118 in the direction of the second end 126 of the housing 122. When a piston rod 112 is utilized, this may retract the piston rod 112 and cause the lever arm 108 to be rotated in the clockwise direction so as to move the braking mechanism 102 to its engaged state. However, by supplying pressurized fluid to the first-side chamber 128, the pressurized fluid may overcome the biasing force applied by the spring 138 and push the piston 118 in the direction of the first end 124 of the housing 122 (e.g., in the direction of arrow 142 shown in FIG. 4), which results in compression of the spring 138 and, when a piston rod 112 is utilized, extension of the piston rod 112 outwardly from the housing 122. Such extension of the piston rod 112 causes the lever arm 108 to rotate in the counter-clockwise direction, thereby moving the braking mechanism 102 to its disengaged state.

It should be appreciated that, for purposes of illustration, the piston 118 is shown in FIG. 3 as being spaced apart a distance 144 from an endwall 146 of the first-side chamber 128 when the piston 118 is moved to its first position. However, in other embodiments, the piston 118 may be positioned closer to or further away from the endwall 146 of the first-side chamber 128 when in the first position, including being positioned directly adjacent to the endwall 128 when moved to the first position. Additionally, as provided in FIG. 4, the piston 118 is shown as being spaced apart a distance 148 from an endwall 150 of the second-side chamber 130 when the piston 118 is moved to its second position. In the illustrated embodiment, such spacing is due to the positioning of an annular flange 152 extending around the outer circumference of the piston rod 112 that engages the endwall 150 and serves as a mechanical stop for the piston/piston rod 118, 112. However, in other embodiments, the annular flange 152 may be positioned at any other suitable location along the length of the piston rod 112. Alternatively, the annular flange 152 may be completely removed from the piston rod 112 so that no mechanical stop is provided for the piston/piston rod 118, 112.

It should additionally be appreciated that, in alternative embodiments, no piston rod 112 may be utilized. For example, brake actuator 104 may be internal to transmission 24 and coupled to transmission by other suitable mechanisms as is generally understood, such that movement of piston 118 causes engagement and disengagement.

Referring still to FIGS. 3 and 4, the brake actuator 104 may also include one or more fluid ports defined within and/or through the housing 122 for supplying fluid into and/or expelling fluid from the housing 122. Specifically, in several embodiments, the brake actuator 104 may include both a supply port 170 and a return port 172 located at or adjacent to the second end 126 of the housing 122 for supplying fluid to and expelling fluid from the first-side chamber 128, respectively. For example, the supply port 170 may be coupled to a suitable fluid source 174 of the work vehicle 10 (e.g., the vehicle's hydraulic tank) to allow fluid to be directed into the housing 122, and specifically to the first-side chamber 128. Similarly, the return port 172 may be coupled to the fluid source 174 to allow fluid expelled from the first-side chamber 128 to be directed back to the fluid source 174.

Notably, the supply or expelling of fluid to or from the housing 122 may be automated. For example, a user of the system 100 and work vehicle 10 may actuate a control device, such as a control device 20. In exemplary embodiments, the control device 20 may be a switch. The control device 20 may be in communication with a processor 190. Processor 190 may further be in communication with the fluid source 174 and/or brake actuator 104 to control the supply of pressurized fluid to the housing 122 in accordance with the present disclosure, as is generally understood.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 190 may also include various input/output channels for receiving inputs from and sending control signals to various other components with which the processor 190 is in communication, such as control device 20, fluid source 174, and/or brake actuator 104.

Figure 5:
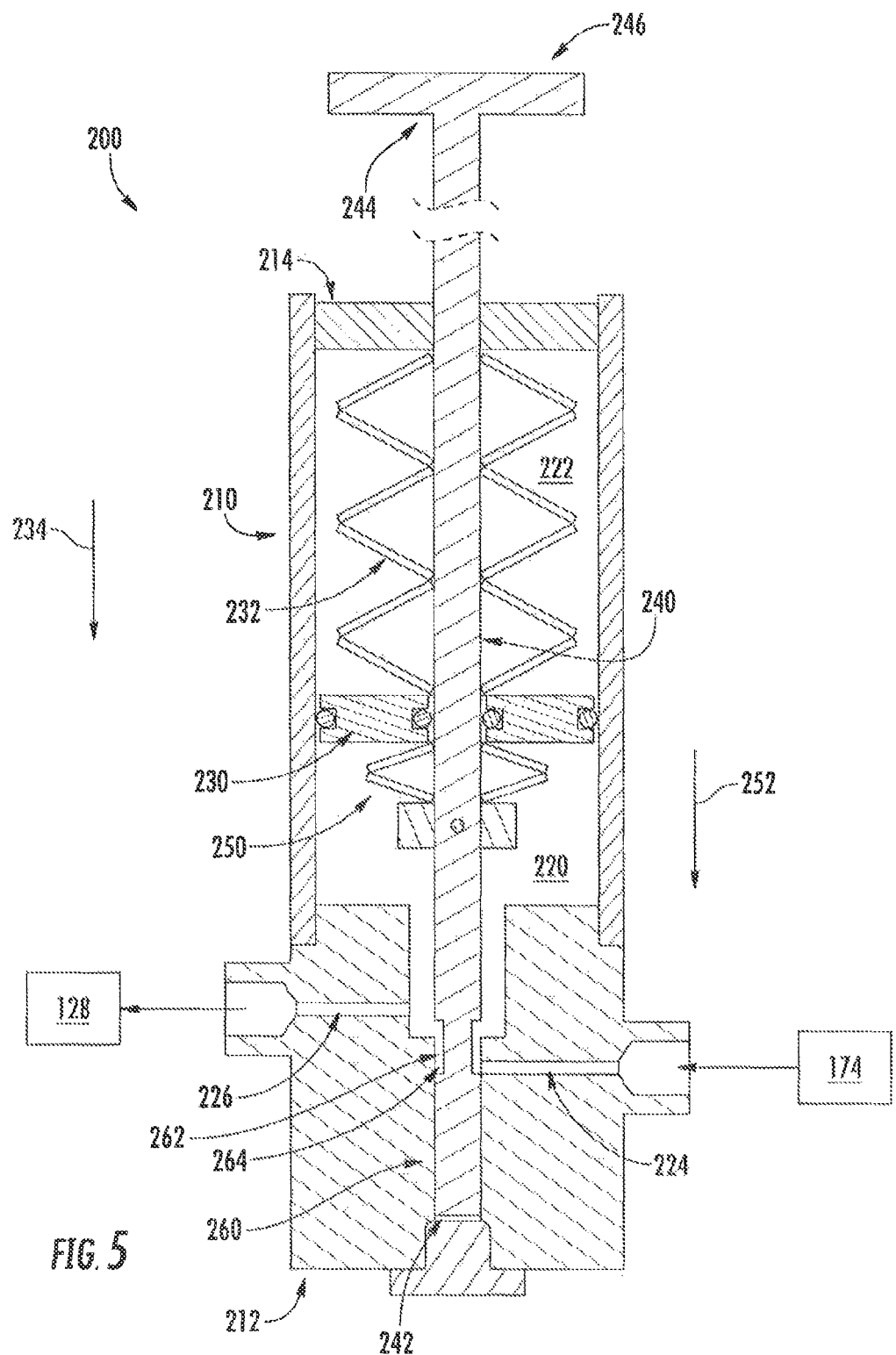
FIG. 5 illustrates a cross-sectional view of a brake modulator of a parking brake system suitable for use with a transmission of the work vehicle shown in FIG. 1, particularly illustrating a piston and a rod each moved to a respective first position.
Figure 6:
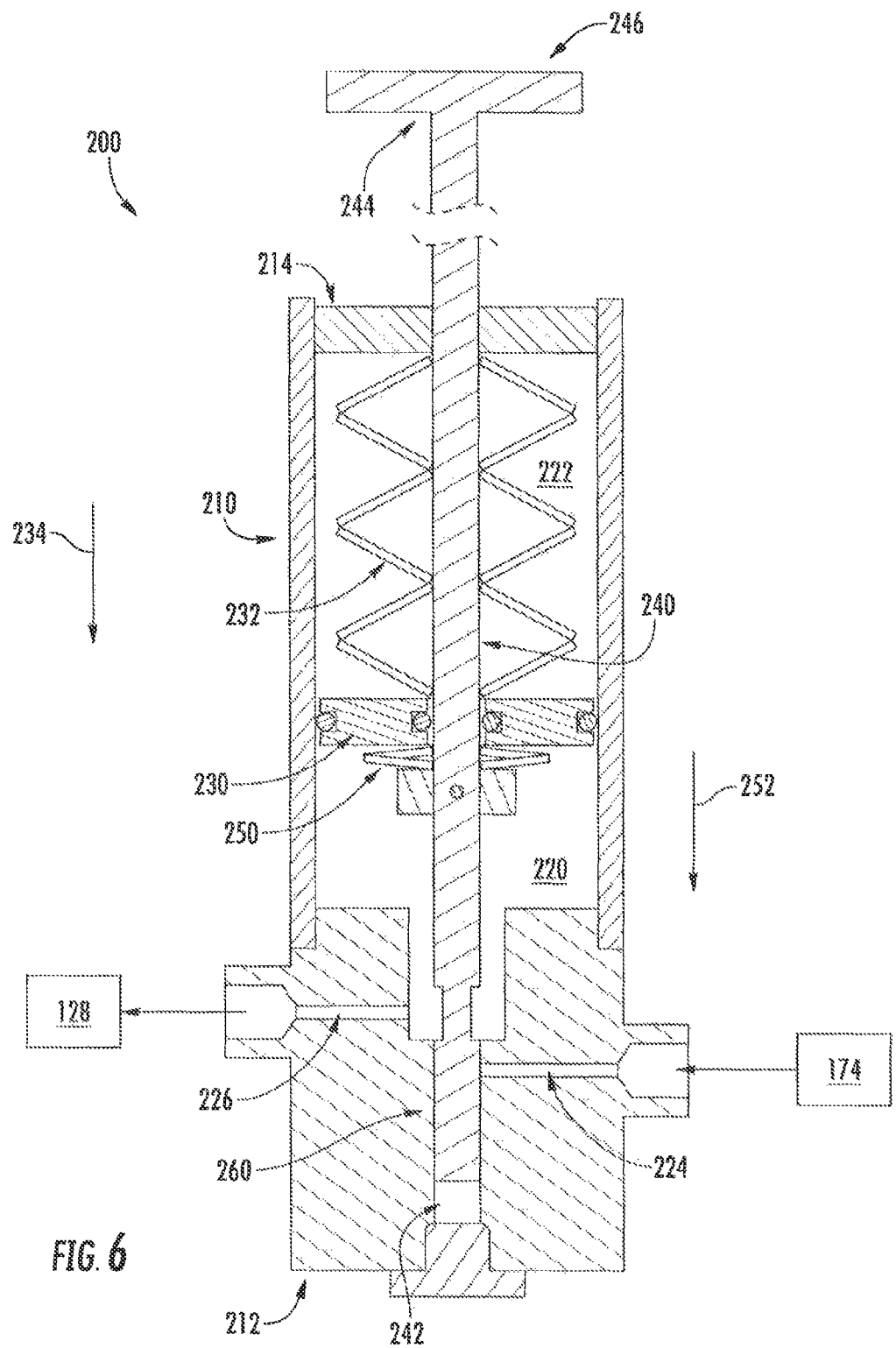
FIG. 6 illustrates another cross-sectional view of a brake modulator of a parking brake system, particularly illustrating a piston moved to a first position and a rod moved to a second position.
Figure 7:
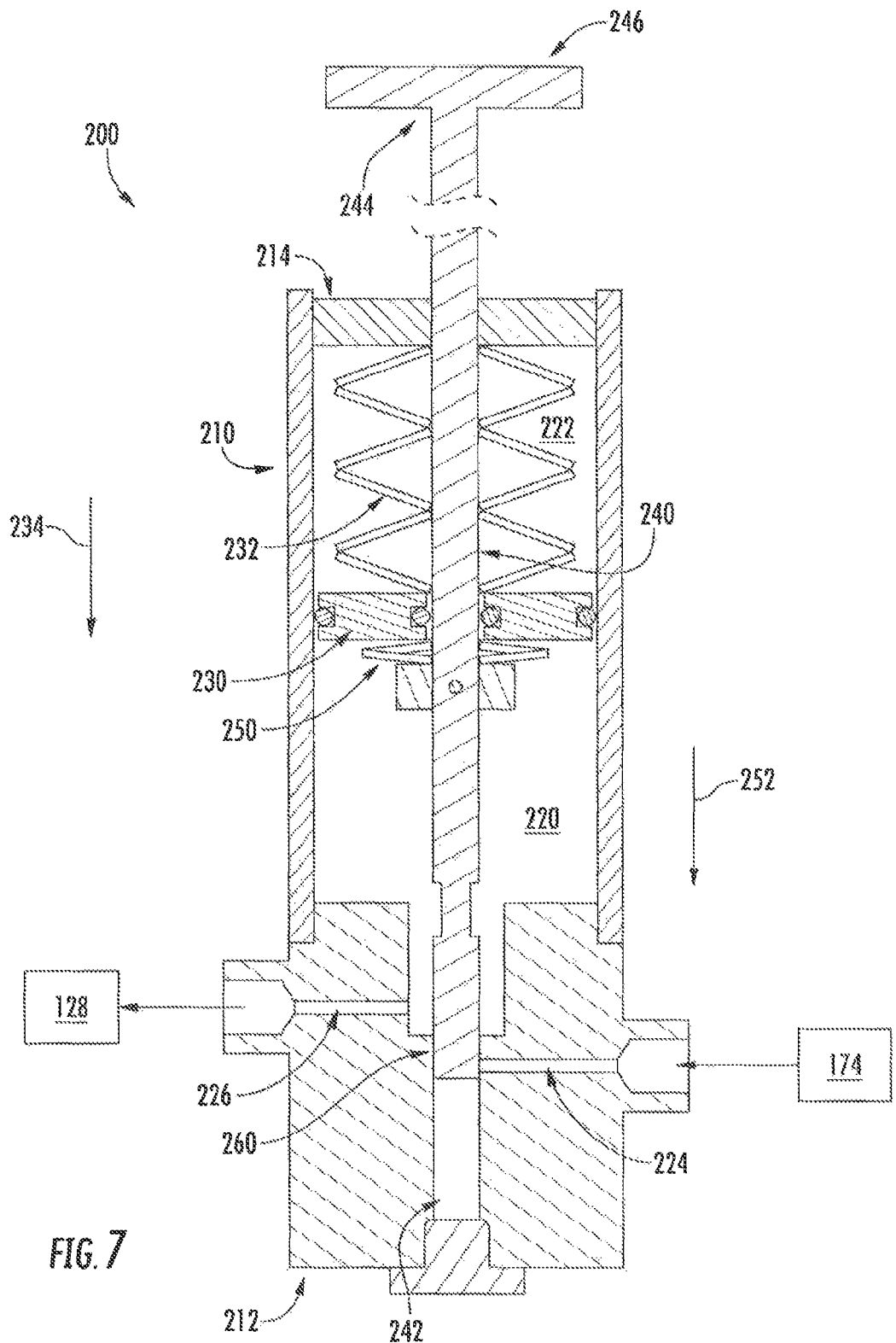
FIG. 7 illustrates another cross-sectional view of a brake modulator of a parking brake system, particularly illustrating a piston and a rod each moved to a respective second position.

Referring now to FIGS. 5 through 7, various embodiments of a brake modulator 200 for use with system 100 are provided. In general, a brake modulator 200 in accordance with the present disclosure provides improved braking capabilities in cases wherein emergency braking is required or improved braking modulation is desired. Brake modulator 200 is generally in fluid communication with the brake actuator 104 and the fluid source 174, such as between the brake actuator 104 and fluid source 174. Accordingly, pressurized fluid flowing from the fluid source 174 to the brake actuator 104 flows through the brake modulator 200, and pressurized fluid flowing from the brake actuator 104 to the fluid source 174 also flows through the brake modulator 200.

The brake modulator 200 is generally a manually operated mechanism for facilitating operation of the braking mechanism 102. Specifically, manual operation of the brake modulator 200 may move the braking mechanism 102 to and between the engaged position and the disengaged position. Brake modulator 200 may, for example, be utilized by a user of a braking system 100 and/or work vehicle 10 in a situation when emergency braking is required. When the brake modulator 200 is in a first position, no engagement of the braking mechanism 102 may occur. When the brake modulator 200 is moved from the first position to the second position, gradual, modulated engagement of the braking mechanism 102 may occur. Such gradual, modulated engagement may be facilitated by biasing elements of the brake modulator 200. Further, movement of the brake modulator 200 from the second position to the first position may disengage the braking mechanism 102 without the need for independent components to facilitate such disengagement.

As shown, a brake modulator 200 may include a housing 210, which may extend between a first end 212 and a second end 214. The housing 210 may generally define within an interior thereof a fluid chamber 220 and an auxiliary chamber 222. Further, a fluid inlet channel 224 may be defined in the housing 210 and may be in fluid communication with the fluid chamber 220, and a fluid outlet channel 224 may be defined in the housing 210 and may be in fluid communication with the fluid chamber 220. Further, the fluid inlet channel 224 may be in fluid communication with the fluid source 174, such as via suitable hoses, etc., to facilitate the flow of pressurized fluid into and from the fluid chamber 220, and may thus be in fluid communication between the fluid source 174 and the fluid chamber 220. The fluid outlet channel 224 may be in fluid communication with the housing 122 and first-side chamber 128 thereof, such as via the supply port 170 and return port 172 via suitable hoses, etc., to facilitate the flow or pressurized fluid into and from the fluid chamber 220. Thus, the fluid outlet channel 224 may be in fluid communication between the fluid chamber 220 and the first-side chamber 128.

Brake modulator 200 may further include a piston 230 which is disposed within the housing 210. The piston 230 is positioned between and defines the fluid chamber 220 and the auxiliary chamber 222. Further, the piston 230 may be movable between a first position (as shown in FIGS. 5 and 6) and a second position (as shown in FIG. 7). In the first position, the fluid chamber 220 has a first volume, while in the second position, the fluid chamber 220 has a second volume that is greater than the first volume.

Movement of the piston 230 between the first position and the second position may cause selective disengagement and engagement of the braking mechanism 102. For example, as discussed above, operation of the brake actuator 104 is dependent upon the supply of pressurized fluid to the first-side chamber 128. A supply of fluid may force the piston 118 of the brake actuator 104 into the second position wherein the braking mechanism 102 is disengaged, while a reduction in fluid may cause the piston 118 to move into the first position wherein the braking mechanism 102 is engaged. As discussed, brake modulator 200 is in fluid communication between the brake actuator 104 and the fluid source 174. Accordingly, actuation of the brake modulator 200 can cause actuation of the brake actuator 104 (and thus of the braking mechanism 102). For example, when the piston 230 is moved from the first position to the second position, the fluid chamber 220 is given an increased volume. This can result in fluid flowing from the first-side chamber 128 towards and into the fluid chamber 220, which in turn can cause the piston 118 to move into the first position wherein the braking mechanism 102 is engaged. When the piston 230 is moved from the second position to the first position, the fluid chamber 220 is given a decreased volume. This can result in fluid flowing from the fluid chamber 220 towards and into the first-side chamber 128, which in turn can cause the piston 118 to move into the second position wherein the braking mechanism 102 is disengaged. Notably, such actuation of the brake modulator 200 to actuate the brake actuator 104 and braking mechanism 102 can be performed independently of actuation of the brake actuator 104 via controller 190, control device 20, etc.

To modulate the movement of the piston 230 between the first and second positions and thus modulate the engagement of the braking mechanism 102, a biasing element 232 may be included in brake modulator 200. The biasing element 232 may provide a biasing force (in direction 234) on the piston 230 towards the first position, and may thus resist movement of the piston 230 towards the second position. This resistance may cause a gradual engagement of the braking mechanism 102 when the piston 230 is moved from the first position to the second position.

In exemplary embodiments, biasing element 232 is a spring, such as a compression spring as shown. Biasing element 232 may, for example, be disposed within the auxiliary chamber 222, such as between the piston 230 and the second end 214. Alternatively, biasing element 232 may be another suitable spring, such as a tension spring. Further, biasing element 232 may alternatively be disposed within the fluid chamber 220. Any suitable biasing element 232 which is configured to provide a biasing force on the piston 230, and which has any suitable positioning within the housing 210, is within the scope and spirit of the present disclosure.

To facilitate movement of the piston 230 between the first position and the second position, brake modulator 200 may further include a rod 240. The rod 240 may extend between a first end 242 and a second end 244. First end 242 may be disposed within the fluid chamber 220 as shown or at another suitable location within the housing 210 (such as within the auxiliary chamber 222), while second end 244 may be disposed exterior to the housing 210 as shown. As discussed, the brake modulator 200 is a manually actuatable device. Accordingly, rod 240 may be manually actuatable to move the piston 230 between the first position and the second position. For example, a handle 246 may be connected to the second end 244 of the rod 240, which may allow a user to pull and push the rod 240 as desired to move the piston 230 between the first position and the second position.

In some embodiments, rod 240 may be connected to piston 230, such that movement of the rod 240 directly causes movement of the piston 230. In other embodiments, as illustrated in FIGS. 5 through 7, rod 240 may be movable through at least a portion of its path, such as between a first position and a second position, relative to the piston 230. For example, brake modulator 200 may further include a secondary biasing element 250 which may connect the rod 240 and the piston 230. Secondary biasing element 250 may provide a biasing force (in direction 252) on the rod 240 towards a first position (as shown in FIG. 5), and may thus resist movement of the rod 240 towards the second position (as shown in FIGS. 6 and 7) relative to piston 230.

In exemplary embodiments, biasing element 250 is a spring, such as a compression spring as shown. Biasing element 250 may, for example, be disposed within the fluid chamber 220. Alternatively, biasing element 250 may be another suitable spring, such as a tension spring. Further, biasing element 250 may alternatively be disposed within the auxiliary chamber 222. Any suitable biasing element 250 which is configured to provide a biasing force on the rod 240, and which has any suitable positioning within the housing 210, is within the scope and spirit of the present disclosure.

Secondary biasing element 250, and the interaction of the rod 240 and piston 230 as a result of the biasing force 252, may allow for an initial movement of the rod 240 relative to the piston 230 before braking is initiated through movement of the piston 230 from the first position to the second position. Further, in exemplary embodiments, such initial relative movement of the rod 240 may block the fluid communication between the fluid inlet channel 224 and the fluid chamber 220. Such isolation of the fluid chamber 220 from the fluid inlet channel 224 may thus isolate the fluid source 174 from the remainder of the system, and prevent fluid flow thereto or therefrom. This may further facilitate operation of the brake modulator 200 to actuate the brake mechanism 102 to an engaged position through increasing of the fluid chamber 220 volume and a disengaged position through decreasing of the fluid chamber 220 volume.

As illustrated, rod 240 is movable between a first position (as shown in FIG. 5) wherein the fluid communication between the fluid inlet channel 224 and the fluid chamber 220 is allowed and a second position (as shown in FIGS. 6 and 7) wherein the fluid communication between the fluid inlet channel 224 and the fluid chamber 220 is blocked. The movement of the rod 240 between the first and second positions may, as illustrated, be independent of the movement of the piston 230. For example, FIG. 5 illustrates the rod 240 and the piston 230 in first positions. FIG. 6 illustrates the rod 240 moved to a second position while the piston 230 remains in a first position. FIG. 7 illustrates the piston 230 in a second position, as well as the rod 240 remaining in the second position. In FIG. 5, the fluid communication between the fluid inlet channel 224 and the fluid chamber 220 is allowed. In FIGS. 6 and 7, the fluid communication between the fluid inlet channel 224 and the fluid chamber 220 is blocked.

It should be understood that rod 240 need not be movable relative to piston 230 in order that the fluid communication between the fluid inlet channel 224 and the fluid chamber 220 be blocked when piston 230 is in the second position. For example, the rod 240 and piston 230 may in alternative embodiments as discussed above be connected, and movement of the rod 240 may necessarily cause movement of the piston 230. During movement of the piston 230 from the first position to the second position, the fluid communication between the fluid inlet channel 224 and the fluid chamber 220 may be blocked, and during movement of the piston 230 from the second position to the first position, the fluid communication between the fluid inlet channel 224 and the fluid chamber 220 may be allowed. In any case, in exemplary embodiments, the fluid communication between the fluid inlet channel 224 and the fluid chamber 220 may be blocked when the piston 230 is in the second position and allowed when the piston 230 is in the first position.

Rod 240 may include various features for selectively allowing or blocking fluid communication between fluid inlet channel 224 and the fluid chamber 220. For example, in some embodiments as shown, rod 240 may include an isolator segment 260 and a flow segment 262. Flow segment 262 may, when aligned with the fluid inlet channel 224 such as when the rod 240 is in a first position and/or the piston 230 is in a first position as discussed herein, allow such fluid communication. For example, flow segment 262 may include a cutaway channel 264 defined in the rod 240 for allowing fluid flow therethrough. Isolator segment 260 may, when aligned with the fluid inlet channel 224 such as when the rod 240 is in a second position and/or the piston 230 is in a first position or second position as discussed herein, block such fluid communication. For example, in some embodiments, isolator segment 260 may simply be a portion of the rod 240 adjacent to the flow segment 262, such as extending between the flow segment 262 and the first end 242. In other embodiments, the isolator segment 260 may have an enlarged width or diameter, or may include other suitable features for blocking such fluid communication.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A brake modulator for a parking brake system of a work vehicle, the brake modulator comprising:
    a housing extending between a first end and a second end, the housing defining a fluid chamber, an auxiliary chamber, a fluid inlet channel in fluid communication with the fluid chamber, and a fluid outlet channel in fluid communication with the fluid chamber;

a piston disposed within the housing between the fluid chamber and the auxiliary chamber, the piston movable between a first position wherein the fluid chamber has a first volume and a second position wherein the fluid chamber has a second volume greater than the first volume;

a first biasing element providing a biasing force on the piston towards the first position;

a rod extending between a first end disposed within the housing and a second end disposed exterior to the housing;

a handle connected to the second end of the rod, wherein the rod is manually actuatable to move the piston between the first position and the second position; and a secondary biasing element which connects the rod and piston, wherein the secondary biasing element is disposed within the fluid chamber.

2. The brake modulator of claim 1, wherein the biasing element is disposed within the auxiliary chamber.

3. The brake modulator of claim 1, wherein the biasing element is a compression spring.

4. The brake modulator of claim 1, wherein the first end of the rod is disposed within the fluid chamber.

5. The brake modulator of claim 1, wherein the rod is movable between a first position wherein the fluid communication between the fluid inlet channel and the fluid chamber is allowed and a second position wherein the fluid communication between the fluid inlet channel and the fluid chamber is blocked.

6. The brake modulator of claim 5, wherein the movement of the rod between the first position and the second position is independent of the movement of the piston.

7. The brake modulator of claim 1, wherein the fluid communication between the fluid inlet channel and the fluid chamber is blocked when the piston is in the second position.

8. The brake modulator of claim 1, wherein the rod comprises an isolator segment and a flow segment, the flow segment configured to allow fluid communication between the fluid inlet channel and the fluid chamber when the piston is in the first position, the isolator segment configured to block fluid communication between the fluid inlet channel and the fluid chamber when the piston is in the second position.

9. A parking brake system for use with a transmission of a work vehicle, the parking brake system comprising:

a braking mechanism housed within the transmission;

a brake actuator, the brake actuator coupled to the braking mechanism to allow the braking mechanism to be actuated between an engaged state and a disengaged state, the brake actuator comprising:

a housing extending between a first end and a second end, the housing defining a second-side chamber and a first-side chamber;

a piston positioned within the housing between the first-side chamber and the second-side chamber, the piston movable between a first position wherein the braking mechanism is actuated to the engaged state and a second position wherein the braking mechanism is actuated to the disengaged state; and a brake modulator in fluid communication with the brake actuator, the brake modulator comprising:

a housing extending between a first end and a second end, the housing defining a fluid chamber, an auxiliary chamber, a fluid inlet channel in fluid communication with the fluid chamber, and a fluid outlet channel in fluid communication between the fluid chamber and the first-side chamber of the brake actuator;

a piston disposed within the housing between the fluid chamber and the auxiliary chamber, the piston movable between a first position wherein the fluid chamber has a first volume and a second position wherein the fluid chamber has a second volume greater than the first volume;

a biasing element providing a biasing force on the piston towards the first position;

a rod extending between a first end disposed within the housing and a second end disposed exterior to the housing; and a handle connected to the second end of the rod, wherein the rod is manually actuatable to move the piston between the first position and the second position, and wherein movement of the piston of the brake modulator to the second position causes movement of the piston of the brake actuator to the first position and movement of the piston of the brake modulator to the first position causes movement of the piston of the brake actuator to the second position.

10. The parking brake system of claim 9, wherein the biasing element is disposed within the auxiliary chamber.

11. The parking brake system of claim 9, wherein the biasing element is a compression spring.

12. The parking brake system of claim 9, further comprising a secondary biasing element connecting the rod and the piston.

13. The parking brake system of claim 12, wherein the secondary biasing element is disposed within the fluid chamber.

14. The parking brake system of claim 12, wherein the rod is movable between a first position wherein the fluid communication between the fluid inlet channel and the fluid chamber is allowed and a second position wherein the fluid communication between the fluid inlet channel and the fluid chamber is blocked.

15. The parking brake system of claim 14, wherein the movement of the rod between the first position and the second position is independent of the movement of the piston.

16. The parking brake system of claim 9, wherein the fluid communication between the fluid inlet channel and the fluid chamber is blocked when the piston is in the second position.

17. The parking brake system of claim 16, wherein the rod comprises an isolator segment and a flow segment, the flow segment configured to allow fluid communication between the fluid inlet channel and the fluid chamber when the piston is in the first position, the isolator segment configured to block fluid communication between the fluid inlet channel and the fluid chamber when the piston is in the second position.

* * * * *